(12) United States Patent
Harris et al.

(10) Patent No.: US 10,023,097 B1
(45) Date of Patent: Jul. 17, 2018

(54) TIE DOWN ASSEMBLY FOR CARGO BED

(71) Applicant: Toyota Motor Engineering & Manufacturing North America, Inc., Erlanger, KY (US)

(72) Inventors: Ryan C. Harris, Saline, MI (US); Scott L. Frederick, Brighton, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 0 days.

(21) Appl. No.: 15/389,359

(22) Filed: Dec. 22, 2016

(51) Int. Cl.
*B60P 7/08* (2006.01)
(52) U.S. Cl.
CPC .................................. *B60P 7/0807* (2013.01)
(58) Field of Classification Search
CPC ..................................................... B60P 7/0807
USPC .................. 410/102, 106, 107, 110, 116
See application file for complete search history.

(56) References Cited

U.S. PATENT DOCUMENTS

| | | | |
|---|---|---|---|
| 3,357,670 A * | 12/1967 | Larson | B60R 9/00 410/106 |
| 3,877,671 A | 4/1975 | Underwood et al. | |
| 5,533,848 A | 7/1996 | Davis | |
| 6,039,520 A | 3/2000 | Cheng | |
| 6,764,259 B1 | 7/2004 | Preta | |
| 8,529,176 B2 * | 9/2013 | Jutila | B60P 7/0807 410/106 |

* cited by examiner

*Primary Examiner* — Stephen Gordon
(74) *Attorney, Agent, or Firm* — Christopher G. Darrow; Darrow Mustafa PC

(57) ABSTRACT

A tie down assembly for a vehicle cargo bed. The tie down assembly is structured to be coupled to a sidewall of a vehicle cargo bed. The assembly includes a mounting bracket structured to be positionable and securable along the sidewall. The assembly also includes a tie down member rotatably coupled to the mounting bracket and including an indexing member. The mounting bracket has a first indexing cavity structured for receiving the indexing member therein, and a second indexing cavity angularly spaced apart from the first indexing cavity and structured for receiving the indexing member therein. The tie down assembly is structured such that the tie down member is secured in a first angular orientation when the indexing member resides within the first indexing cavity, and in a second angular orientation different from the first angular orientation when the indexing member resides within the second indexing cavity.

14 Claims, 8 Drawing Sheets

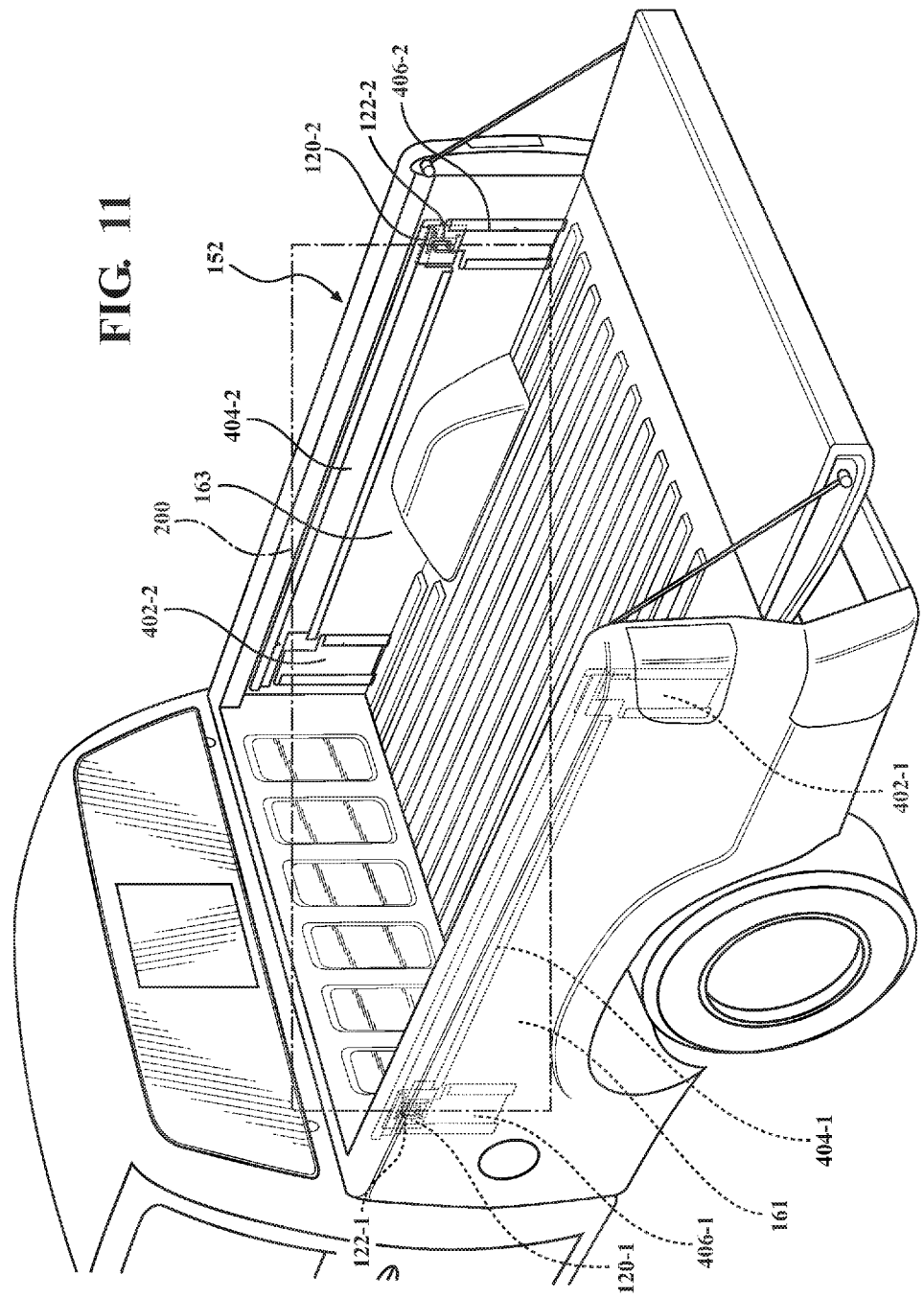

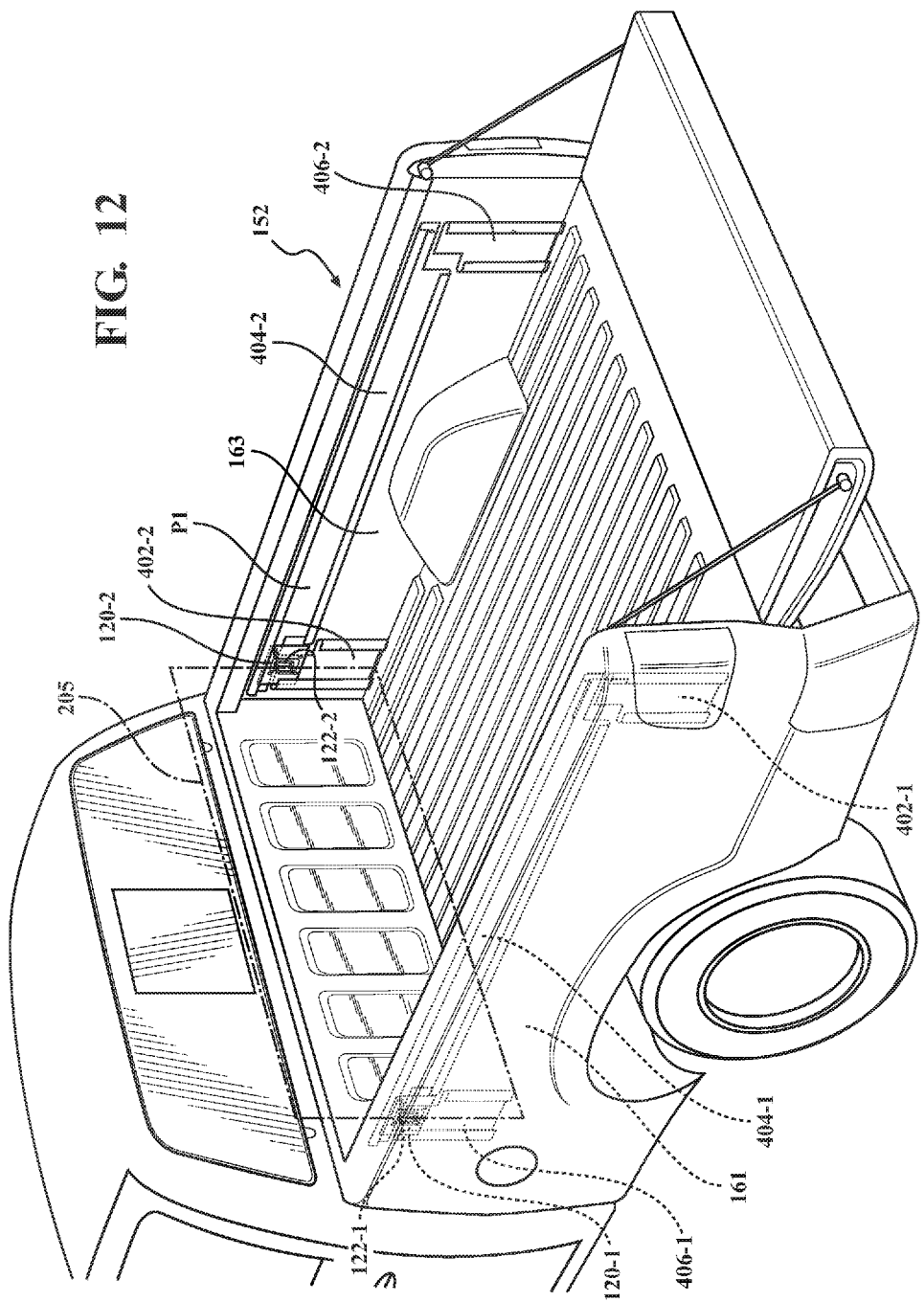

TIE DOWN ASSEMBLY FOR CARGO BED

TECHNICAL FIELD

The present invention relates to tie down members for vehicle cargo beds, which may be usable for securing cargo loaded in the cargo bed.

BACKGROUND

Tie down hooks or handles may be secured to sidewalls of a cargo bed. These hooks may extend from the sidewall in a direction perpendicular to a fore-aft axis of the vehicle. Ends of tie down straps may be attached to the hooks to secure cargo loaded into the cargo bed. However, the forces exerted on the tie-down hooks by tie down straps may vary depending on cargo size and shape. Having hooks in fixed orientations may result in an undesirable loading condition which may lead to damage or deformation of the hooks or the sidewalls to which the hooks are attached. For example, if the hook extending perpendicular to a fore-aft axis of the vehicle is loaded at an angle of 45° angle with respect to the fore-aft axis, the tie down hooks or side panel mounting points may be damaged.

SUMMARY

In one aspect of the embodiments described herein, a tie down assembly is provided. The tie down assembly is structured to be coupled to a sidewall of a vehicle cargo bed. The assembly includes a mounting bracket structured to be positionable and securable along a sidewall of a vehicle cargo bed. The assembly also includes a tie down member rotatably coupled to the mounting bracket and including an indexing member. The mounting bracket has a first indexing cavity structured for receiving the indexing member therein, and a second indexing cavity angularly spaced apart from the first indexing cavity and structured for receiving the indexing member therein. The tie down assembly is structured such that the tie down member is secured in a first angular orientation when the indexing member resides within the first indexing cavity, and in a second angular orientation different from the first angular orientation when the indexing member resides within the second indexing cavity.

In another aspect of the embodiments described herein, a vehicle cargo bed is provided. The cargo bed includes a pair of opposed sidewalls and a first tie down assembly secured to a first location along a first sidewall of the pair of opposed sidewalls. The first tie down assembly includes a first tie down member securable in a first angular orientation when the first tie down assembly is secured in the first location. The cargo bed also includes a second tie down assembly secured to a second location along a second sidewall of the pair of opposed sidewalls. The second tie down assembly includes a second tie down member securable in a second angular orientation when the second tie down assembly is secured in the second location, such that the second angular orientation is aligned with the first angular orientation.

In another aspect of the embodiments described herein, a tie down system for a vehicle cargo bed is provided. The tie down system includes a first guide member structured to be mountable along a first sidewall of the vehicle cargo bed, and a first tie down assembly coupled to the first guide member so as to be movable along the first guide member. The first tie down assembly is securable in at least one predetermined location along the first guide member. The first tie down assembly includes a tie down member securable in a first angular orientation when the first tie down assembly is secured in the at least one predetermined location along the first guide member. A second guide member is structured to be mountable along a second sidewall of the vehicle cargo bed opposite the first guide member. A second tie down assembly is coupled to the second guide member so as to be movable along the second guide member. The second tie down assembly is securable in at least one first predetermined location along the second guide member. The second tie down assembly includes a tie down member securable in a second angular orientation when the second tie down assembly is secured in the at least one predetermined location along the second guide member, such that the second angular orientation is aligned with the first angular orientation.

BRIEF DESCRIPTION OF THE DRAWINGS

FIG. 11 is a schematic perspective view of a pickup truck including a tie down system in accordance with an embodiment described herein.

FIG. 12 is the schematic perspective view of FIG. 11 showing a tie down assembly of the tie down system secured in a different location, to meet a tie down requirement different from the requirement met by the configuration in FIG. 11.

DETAILED DESCRIPTION

The embodiments described herein relate to a tie down assembly for a vehicle cargo bed. The tie down assembly is structured to be coupled to a sidewall of the cargo bed. The assembly includes a mounting bracket structured to be positionable and securable along a sidewall of a vehicle cargo bed. The assembly also includes a tie down member rotatably coupled to the mounting bracket. The tie down member is securable in any of multiple orientations, to adapt to tie down requirements of a particular application. In addition, one or more guide members may be attached to the cargo bed sidewalls to enable flexible positioning of the tie down assembly at various locations along the sidewalls.

In the following detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

Figure 1:
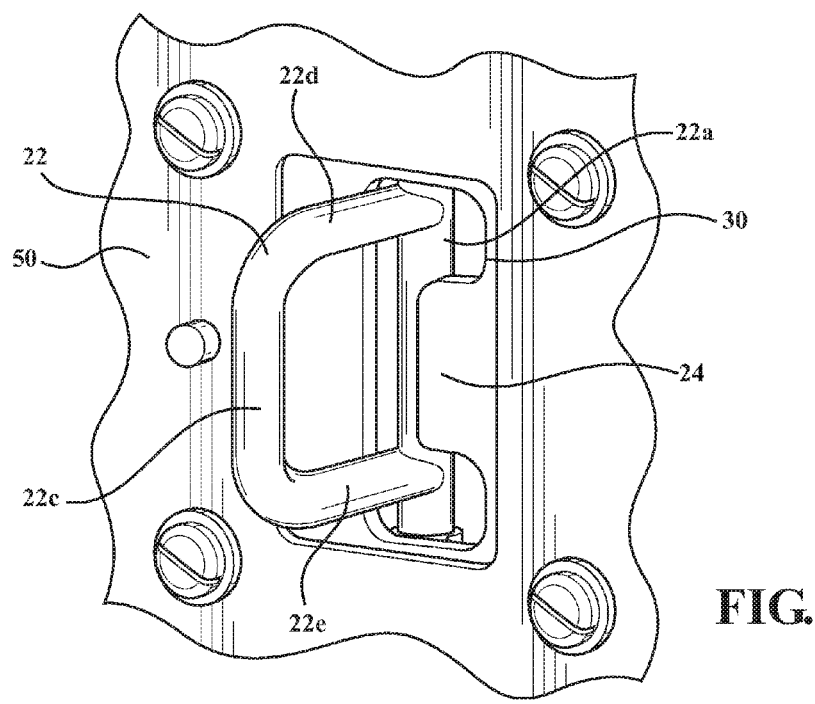
FIG. 1 is a schematic perspective frontal view of a tie down assembly in accordance with an embodiment described herein, from the perspective of a viewer in side a cargo bed of a vehicle.
Figure 2:
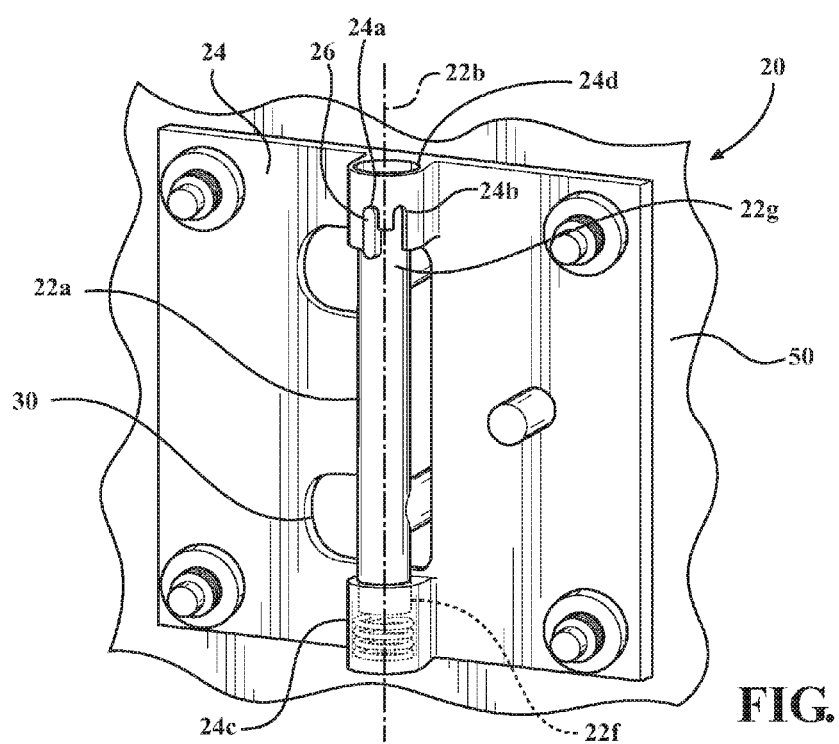
FIG. 2 is a schematic perspective rear view of the tie down assembly shown in FIG. 1.
Figure 3:
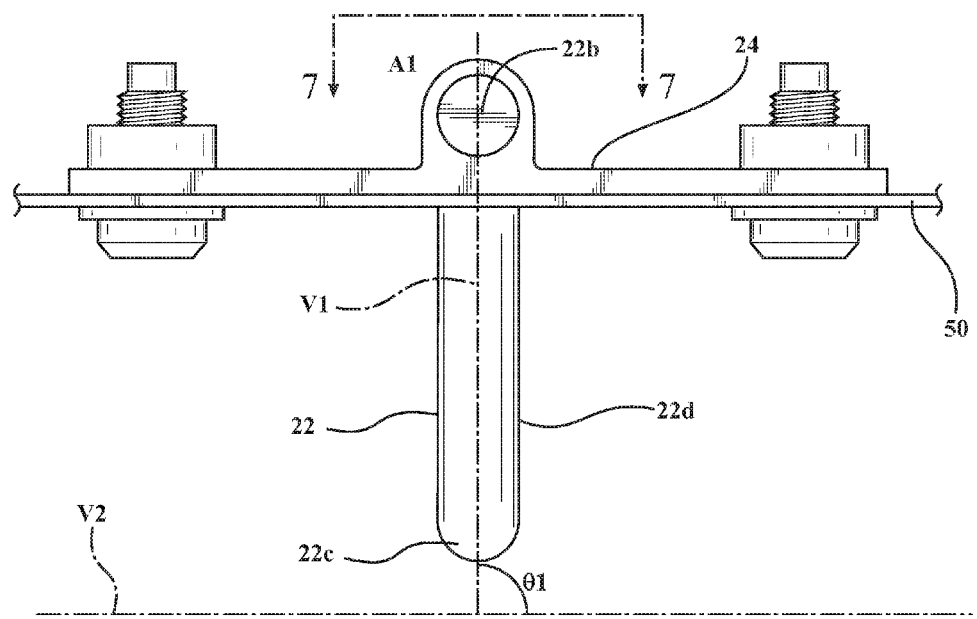
FIG. 3 is a schematic plan view of the tie down assembly of FIG. 1, shown with a tie down member of the tie down assembly in a first angular orientation.
Figure 4:
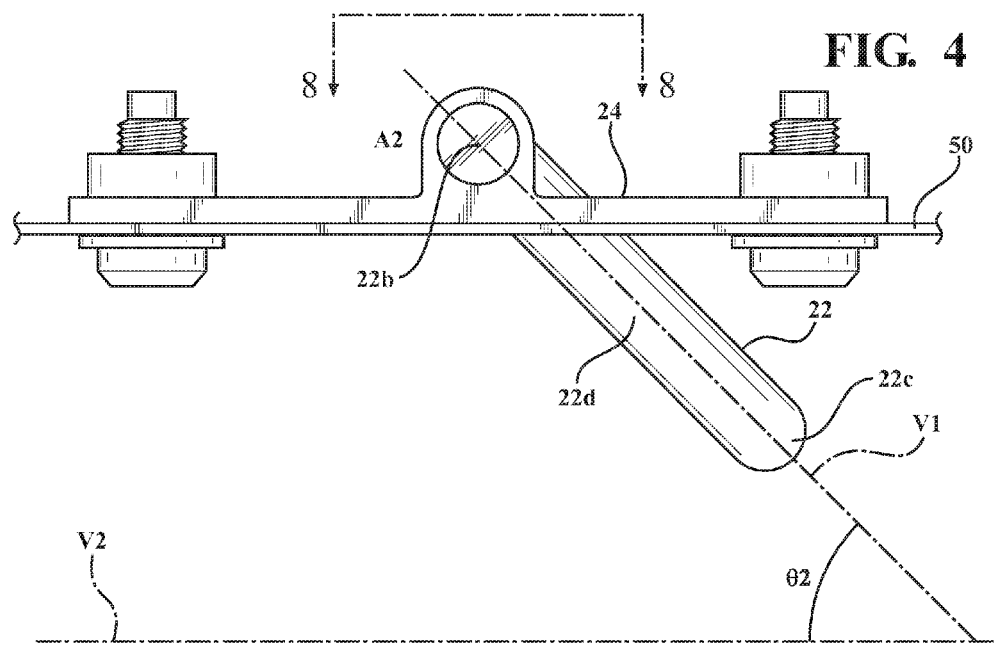
FIG. 4 is another schematic plan view of the tie down assembly of FIG. 1, shown with the tie down member in a second angular orientation different from the first orientation.

FIGS. 1-5 and 7-8 show various views of a tie down assembly 20 in accordance with an embodiment described herein. FIG. 1 is a schematic perspective frontal view of the tie down assembly 20, from the perspective of a viewer inside a cargo bed of a vehicle. FIG. 2 is a schematic perspective rear view of the tie down assembly 20 shown in FIG. 1. FIG. 3 is a schematic plan view of the tie down assembly 20 of FIG. 1, shown with a tie down member 22 of the tie down assembly 20 in a first angular orientation. FIG. 4 is another schematic plan view of the tie down assembly 20 of FIG. 1, shown with the tie down member 22 in a second angular orientation different from the first orientation.

One or more embodiments of the tie down assembly described herein are structured to be coupled to a sidewall (generally designated 50 in FIGS. 1-6) of a vehicle cargo bed. For purposes of mounting a tie down assembly thereto, a "sidewall of a vehicle cargo bed" is understood to include such features as a metal sidewall of a pickup truck bed, a wall of a polymeric bed liner which may cover (or serve as) a sidewall of a pickup truck cargo bed, and also to any other structure which may be attached to a metal sidewall or bed liner so as to be mounted along the cargo bed sidewall.

Figure 7:
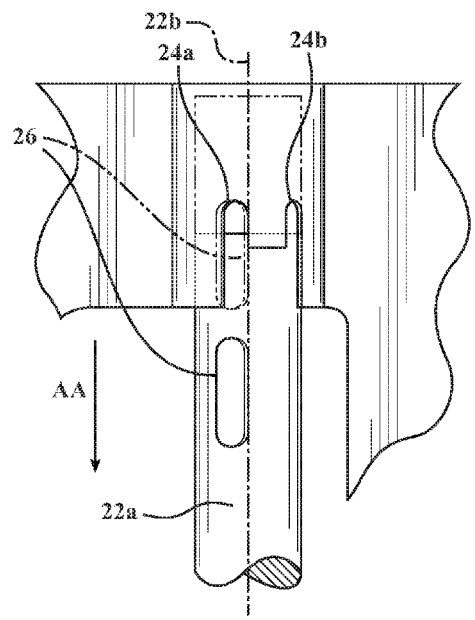
FIGS. 7 and 8 are schematic side views of a portion of the tie down assembly shown in FIG. 2, showing disengagement of an indexing member from one indexing cavity and positioning of the indexing member in another indexing cavity.
Figure 8:
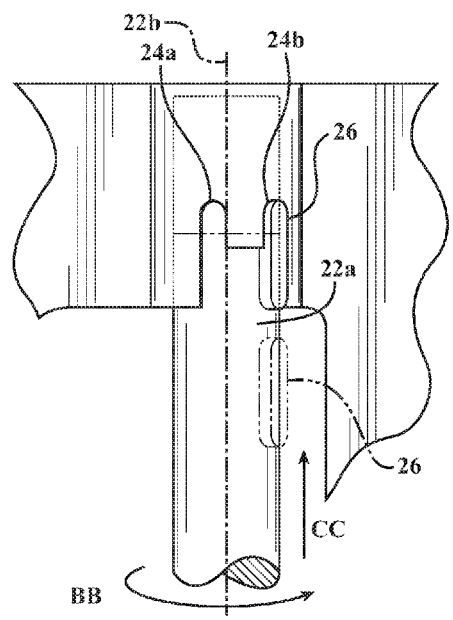
Figure 9:
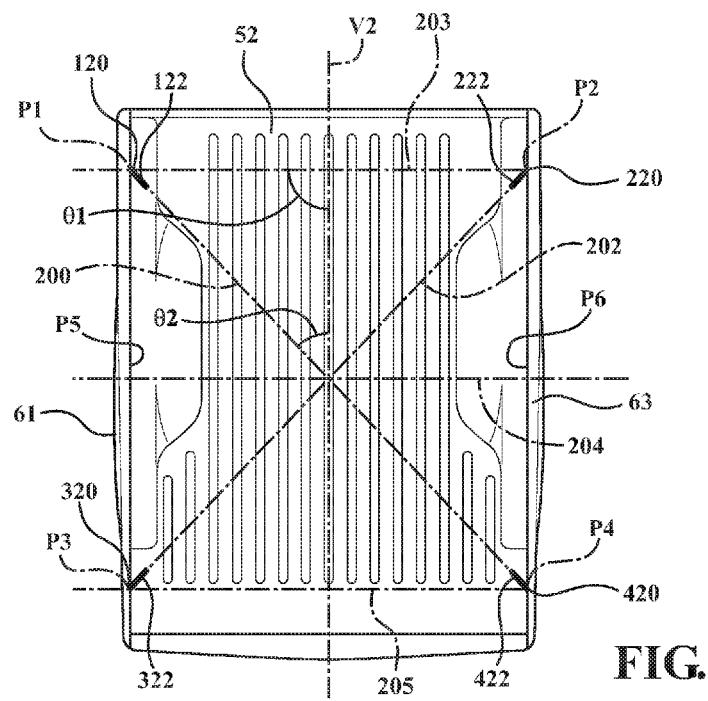
FIG. 9 is a schematic plan view of a vehicle cargo bed incorporating multiple tie down assemblies in accordance with at least one embodiment described herein.

FIGS. 1-8 show embodiments 120 and 320 of the tie down assembly attached to a sidewall of a truck cargo bed. In the embodiment shown in FIGS. 1-8, the tie down assembly 20 includes a mounting bracket 24 structured to be positionable and securable in a desired position along a sidewall 50 of a vehicle cargo bed 52 (as shown in FIG. 9).

A tie down member 22 is rotatably coupled to the mounting bracket 24 and includes an indexing member 26 extending along an exterior surface thereof. The tie down member 22 includes a base portion 22a rotatable with respect to the mounting bracket 24 about an axis 22b, and a tie down attachment portion 22c attached to the base portion 22a and spaced apart from the base portion. The tie down attachment portion 22c is structured for attachment of a tie-down strap (not shown) thereto. As used herein, the term "tie-down strap" may refer to any webbing, strap, rope, or any other device that may be tied or connected to the tie-down attachment portions of tie down members, and wrapped over or around one or more items of cargo to secure the cargo in the cargo bed.

As seen in the view of FIGS. 1-4, the mounting bracket 24 may have an opening 30 formed therein, and the base portion 22a may be rotatably connected to the mounting bracket 24 along a first side of the mounting bracket. Tie down attachment portion 22c may be connected to the base portion 22a through the opening 30 and may reside on a second side of the mounting bracket 24 opposite the first side. In addition, the tie down attachment portion 22c may extend from the base portion 22a in a direction toward and/or into the cargo bed 52. In the embodiment shown, the tie down attachment portion 22c is "C"-shaped or "U"-shaped. However, the tie down 22c attachment portion may have any shape suitable for the purposes described herein. In particular embodiments, the tie down attachment portion 22c extends parallel to the base portion 22a. In the embodiment shown in FIGS. 1-4, the tie down attachment portion 22c includes, and is attached to the base portion 22a by, a pair of arms 22d and 22e, each arm extending from an associated end of the tie down attachment portion 22c.

As seen in FIGS. 2, 5, 7 and 8, the tie down member base portion 22a may have a first end 22f and a second end 22g opposite the first end. The indexing member 26 may be formed along or mounted proximate the base portion second end 22g. The mounting bracket 24 may include a first indexing cavity 24a structured for receiving the indexing member 26 therein. The mounting bracket 24 may also include a second indexing cavity 24b angularly spaced apart from the first indexing cavity and structured for receiving the indexing member 26 therein. In addition, the mounting bracket 24 may include a first receptacle 24c and a second receptacle 24d. The second receptacle 24d may be positioned opposite the first receptacle 24c. The first receptacle 24c may be structured for receiving a spring member 54 therein, and may also be structured for receiving the base portion first end 22f therein so as to engage the spring member 54.

The spring member 54 may be structured to bias the tie down member 22 so as to maintain the indexing member 26 in a selected one of the first indexing cavity 24a and the second indexing cavity 24b. The second receptacle 24d may be structured for receiving the base portion second end 22g therein. The second receptacle 24d may have the first indexing cavity 24a and the second indexing cavity 24b formed therein or therealong.

The tie down assembly 20 may be structured such that the tie down member 22 is securable in a first angular orientation A1 (shown in FIG. 3) by positioning the indexing member to reside within the first indexing cavity 24a, and also securable in at least a second angular orientation A2 (shown in FIG. 4) different from the first angular orientation A1 by positioning the indexing member 26 to reside within the second indexing cavity 24b. The second angular orientation may lie in any rotational direction with respect to the first angular orientation, depending on the requirements of a particular application. Thus, when the indexing member 26 resides within one of the first and second indexing cavities 24a and 24b, the tie down member 22 is prevented from rotating about the axis 22b.

An "angular orientation" of the tie down member may include a direction in which the tie down attachment portion 22c resides with respect to a rotational axis 22b of the base portion 22a. In one or more embodiments, the tie down assembly 20 may be structured such that, when the tie down member 22 is secured in the first angular orientation A1, a vertical plane V1 passing through the tie down attachment portion 22c and a rotational axis 22b of the base portion 22a extends at a first predetermined angle $\theta_1$ with respect to a vertical plane V2 extending through the fore-aft axis of the vehicle, when the tie down assembly is positioned along the sidewall of the vehicle cargo bed. Examples of such an arrangement are shown in FIGS. 3 and 9.

Also, the tie down assembly 20 may be structured such that, when the tie down member 22 is secured in the second angular orientation A2, a vertical plane V1 passing through the tie down attachment portion 22c and the rotational axis 22b of the base portion 22a extends at a second predetermined angle $\theta_2$ with respect to the vertical plane V2 when the tie down assembly is positioned along the sidewall of the vehicle cargo bed, where the second predetermined angle $\theta_2$ is different from the first predetermined angle $\theta_1$. Examples of such an arrangement are shown in FIGS. 4 and 9.

In one or more arrangements, the first and second predetermined angles $\theta_1$ and $\theta_2$ may have values of 90°, 60°, or 45, within applicable angular tolerance limits of the tie down assembly. Other values of the predetermined angles $\theta_1$ and $\theta_2$ are also possible, depending on the requirements of a particular application. That is, the locations of the indexing cavities formed in the mounting bracket may be adjusted to provide any desired orientation angle with respect a vertical plane V2 extending through the vehicle fore-aft axis.

Figure 5:
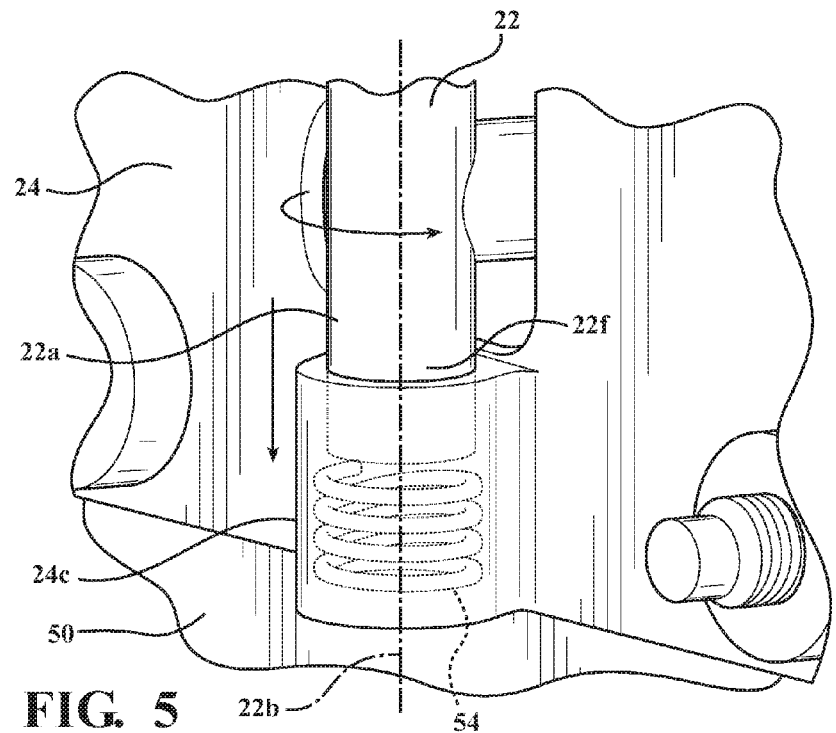
FIG. 5 is a schematic perspective view of a portion of the tie down assembly shown in FIG. 2.

FIG. 5 is a perspective view of a portion of the tie down assembly shown in FIG. 2. The tie down member base portion first and second ends 22f and 22g may be movable within respective ones of the first and second receptacles 24c and 24d so as to enable movement of the indexing member 26 in and out of the first indexing cavity 24a and the second indexing cavity 24b. In addition, the base portion first end 22f may be movable within the first receptacle 24c to compress the spring member 54 whenever the indexing member 26 moves out of the first indexing cavity 24a or out of the second indexing cavity 24b.

The tie down assembly 20 is structured such that movement of the indexing member 26 out of either of the first indexing cavity 24a and the second indexing cavity 24b compresses the spring member 54 and enables rotation of the base portion 22a. FIGS. 1-8 illustrate examples of manipulation of the tie down member 22 to change an angular orientation of the member from a first orientation A1 to a second orientation A2. FIGS. 7 and 8 show side views of a portion of the rear view of the tie down member 22 as shown in FIGS. 1-5. FIGS. 7 and 8 show disengagement of an indexing member from one indexing cavity and positioning of the indexing member in another indexing cavity. In the views shown in FIGS. 3, 5, and 7, the indexing member 26 of tie down member 22 is positioned within first indexing cavity 24a and in a first angular orientation A1. A plane V1 passing through the tie down attachment portion 22c and a rotational axis 22b of the base portion 22a extends at a first predetermined angle $\theta_1$ of 90° with respect to a vertical plane V2 extending through a fore-aft axis of the vehicle. The plane V2 may alternatively be a vertical plane which would extend through the vehicle fore-aft axis if the tie down member were mounted along a sidewall of a cargo bed of the vehicle, in a normal usage position.

Referring to FIGS. 3-5 and 7-8, when it is desired to change the angular orientation of the tie-down member 22, the tie down member 22 is pressed downwardly as shown in FIG. 7, forcing the base portion first end 22f to compress the spring member 54 positioned within the first receptacle 24c. This motion also extracts the indexing member 26 from the first indexing cavity 24a of the second receptacle 24d as shown in FIG. 7, thereby enabling the base portion 22a to be rotated as shown in FIGS. 5 and 8. The tie down member 22 may then be rotated about the base portion axis 22b as shown in FIGS. 5 and 8 until the tie down member reaches a second angular orientation A2 in which the plane V1 passing through the tie down attachment portion 22c and the rotational axis 22b of the base portion 22a extends at a second predetermined angle $\theta_2$ of 45° with respect to a vertical plane V2 extending through a fore-aft axis of the vehicle, as shown in FIG. 4. At this point, the indexing member 26 is aligned with the second indexing cavity 24b. The tie down member 22 may then be released, allowing the spring member 54 to move the base portion second end 22g in a direction toward the second receptacle 24d, thereby inserting the indexing member 26 into the second indexing cavity 24b. The tie down member 22 is now secured in the second angular orientation A2.

Figure 4A:
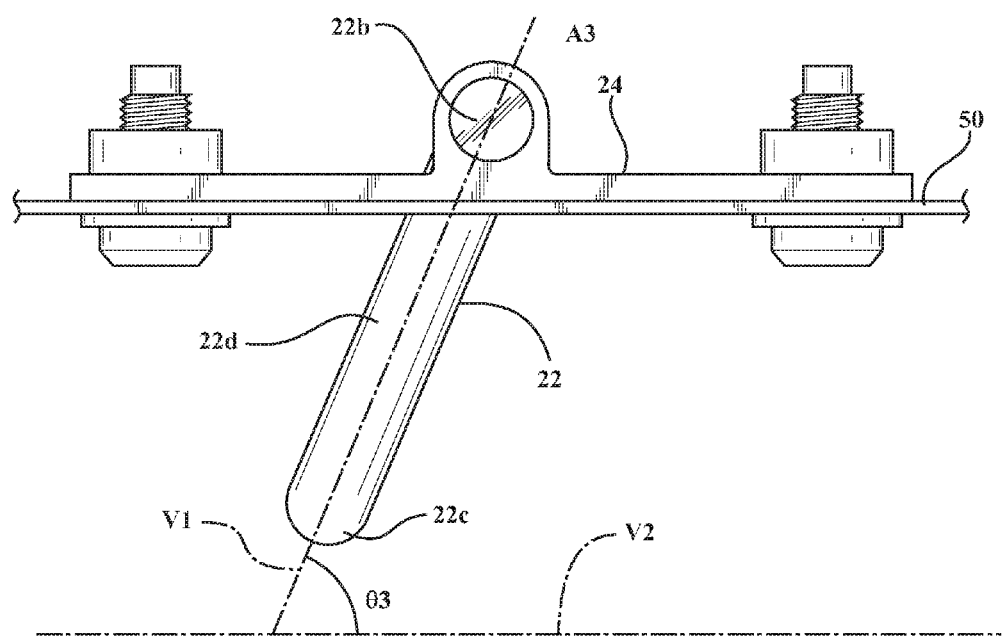
FIG. 4A is another schematic plan view of the tie down assembly of FIG. 1, shown with the tie down member in a third angular orientation different from the first and second angular orientations.

In one or more arrangements, the mounting bracket 24 may include a third indexing cavity (not shown) formed in the second receptacle 24d. The third indexing cavity may be angularly spaced apart from the first indexing cavity 24a, on a side of the first indexing cavity opposite the side on which the second indexing cavity 24b is positioned. The tie down member 22 then may be securable in a third angular orientation A3 (shown in FIG. 4A) different from the first and second angular orientations A1 and A2 when the indexing member resides within the third indexing cavity. In the third angular orientation A3, the tie down member may reside at a third predetermined angle $\theta_3$ with respect to the vertical plane V2. Thus, when the indexing member 26 resides within the third indexing cavity, the tie down member 22 is also prevented from rotating about the axis 22b.

FIG. 9 is a schematic plan view of a possible arrangement of tie down assemblies 120, 220, 320, and 420 secured to sidewalls 61 and 63 of a vehicle cargo bed 52. Each of the tie down members 122, 222, 322, and 422 of the tie down assemblies 120, 220, 320, and 420, respectively, may be securable at angles of 90° and 45° as just described. For example, tie down assemblies 120, 220, 320, and 420 may be positioned at locations P1-P4 along the cargo bed sidewalls.

As shown in FIG. 9, the vehicle cargo bed 52 may include a pair of opposed sidewalls 61 and 63, and a first tie down assembly 120 secured to a first location P1 along a first sidewall 61 of the opposed sidewalls. The first tie down assembly 120 may include a first tie down member 122 as previously described, which is securable in a first angular orientation when the first tie down assembly is secured in the first location P1. A second tie down assembly 420 may be secured to a second location P4 along a second sidewall 63 of the pair of opposed sidewalls. The second tie down assembly 420 may include another, second tie down member 422 securable in a second angular orientation when the second tie down assembly 420 is secured in the second location P4, such that the second angular orientation is aligned with the first angular orientation of the first tie down assembly 120.

The angular orientations of two tie down members mounted on associated mounting brackets are considered to be "aligned" or "in alignment" when a plane passing through the rotational axes of the respective base portions of the tie down members also passes through the associated tie down attachment portions of the tie down members, so that the forces exerted on a tie down strap, etc. connecting the tie down attachment portions tend to act along the common plane.

For example, referring to FIG. 9, the angular orientations of two tie down members 122 and 422 mounted on associated mounting brackets are "aligned" or "in alignment" when a vertical plane 200 passing through the rotational axes of the respective base portions 122a and 422a of the tie down members also passes through the associated tie down attachment portions 122*c* and 422*c* of the tie down members, so that the forces exerted on a tie down strap, etc. connecting the tie down attachment portions tend to act along the plane 200. This alignment helps to prevent the exertion of force moments about the rotational axes of the tie down members, which may bend or distort the tie down members. FIG. 9 shows examples of tie down members which are mounted on opposed guide members and whose angular orientations are in alignment. For example, the angular orientations of tie down members 122 and 422 are in alignment, and the angular orientations of tie down members 222 and 322 are in alignment.

Thus, in FIG. 9, the angular orientations of the first and second tie down members 122 and 422 at locations P1 and P4 are in alignment along plane 200, with the tie down members secured at angles of 45° with respect to a vertical plane V2 extending through the fore-aft axis of the vehicle (or extending parallel to what would be the fore-aft axis of the vehicle if the cargo bed were to be positioned in the vehicle). Similarly, the angular orientations of the tie down members 222 and 322 at locations P2 and P3 are in alignment along a vertical plane 202, with the tie down members secured at angles of 45° with respect to the plane V2. Thus, opposite ends of a tie down strap (not shown) may be attached to tie down attachment portions of tie down members 122 and 422 at locations P1 and P4 so as to extend between and secure cargo located between the tie down members. Also, opposite ends of a tie down strap (not shown) may be attached to tie down attachment portions of tie down members 222 and 322 at locations P2 and P3 so as to extend between and secure cargo located between tie down members 222 and 322.

If desired, additional tie down assemblies (not shown) may be secured along the cargo bed sides at locations P5 and P6 approximately midway between opposite ends of the cargo bed, or at other locations along the sidewalls. These tie down assemblies may include associated tie down members secured at angles of 90° with respect to plane V2. The angular orientations of the tie down members at locations P5 and P6 may be in alignment along a vertical plane 204. Thus, opposite ends of a tie down strap (not shown) may be attached to tie down attachment portions of the tie down members at locations P5 and P6 so as to extend between and secure cargo located between the tie down members at locations P5 and P6.

Alternatively, the tie down members 122 and 222 at locations P1 and P2 may be rotated to 90° with respect to plane V2 as previously described, to align their respective angular orientations along a vertical plane 203. Then opposite ends of a tie down strap (not shown) may be attached to tie down attachment portions of tie down members 122 and 222 in these new orientations. Also, the tie down members 322 and 422 at locations P3 and P4 may be rotated to 90° with respect to plane V2 as previously described, to align their respective angular orientations along a vertical plane 205. Then opposite ends of a tie down strap (not shown) may be attached to tie down attachment portions of tie down members 322 and 422 in these new orientations.

While the example just described enables securement of the tie down members at angular orientations of 90° and 45° with respect to a vertical plane extending through the vehicle fore-aft axis, alternative embodiments of the tie down assembly may enable securement of a tie down member at other angular orientations. The mounting bracket may incorporate any desired number of indexing cavities, arranged at any desired angular locations with respect to each other, depending on such factors as operational requirements for a given cargo bed design, the size of the indexing member, the size of the second receptacle 24*d*, and other pertinent factors. The ability to tailor the angular arrangement of the indexing cavities with respect to the plane V2 and with respect to each other enables the tie down assembly design to be optimized for cargo beds having a wide variety of dimensions.

Figure 6:
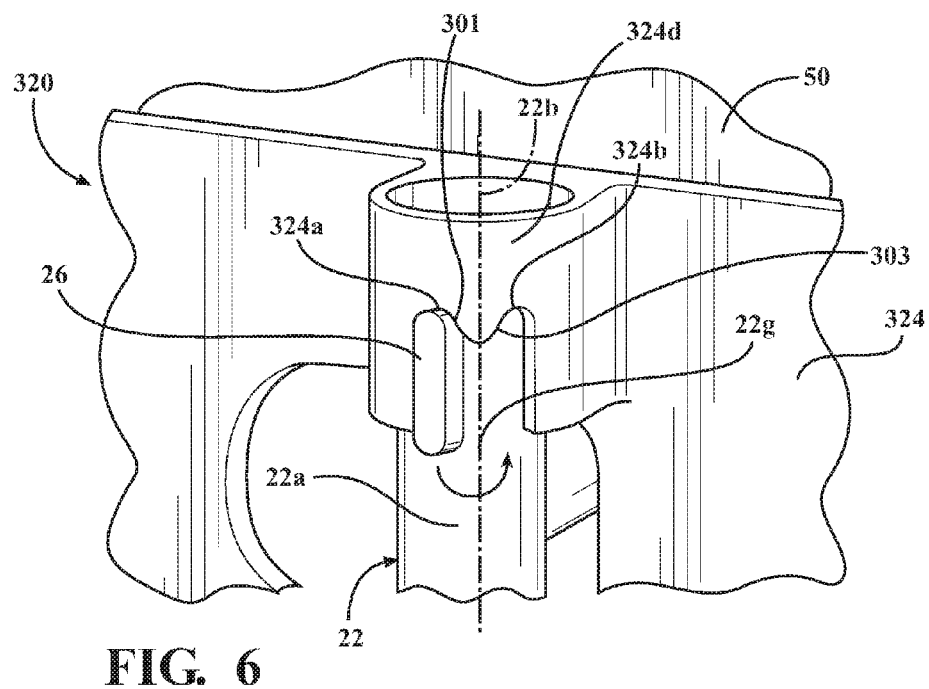
FIG. 6 is a schematic perspective view of an alternative embodiment of the portion of the tie down assembly shown in FIGS. 7 and 8.

FIG. 6 shows an alternative embodiment 324*d* of the second receptacle having first and second indexing cavities 324*a* and 324*b* similar to the indexing cavities previously described. In this embodiment, at least one of the first indexing cavity 324*a* and the second indexing cavity 324*b* has a first sloping wall and a second sloping wall extending opposite the first sloping wall. In the embodiment shown in FIG. 6, each of the indexing cavities 324*a* and 324*b* has a sloping wall, with cavity 324*a* having a sloping wall 301 and cavity 324*b* having a sloping wall 303. In addition, the tie down assembly into which the second receptacle is incorporated may be structured such that rotation of an associated tie down member (not shown) from one of the first angular orientation and the second angular orientation toward the other one of the first angular orientation and the second angular orientation causes the indexing member to slide along a corresponding one of the first sloping wall 301 and the second sloping wall 303. In addition, sliding of the indexing member along one of the first sloping wall 301 and the second sloping wall 303 causes the spring member to be compressed, so that the indexing member remains biased against the sloped surfaces 301 and 303 during rotation of the tie down member. Thus, the sloping surfaces 301 and 303 act as detents which inhibit rotation of the tie down member from one angular orientation to another angular orientation. The force required to rotate the tie down member from one angular orientation to another angular orientation against the detents may be modified by adjusting such parameters as the force-deflection characteristics of the spring member, the orientation of the sloping surfaces, and other pertinent parameters. The tie down member may also be rotated as previously described, by moving the tie down member vertically so as to compress the spring member and move the indexing member past the junction 305 of the sloped surfaces, and then rotating the tie down member in the desired direction.

Figure 10:
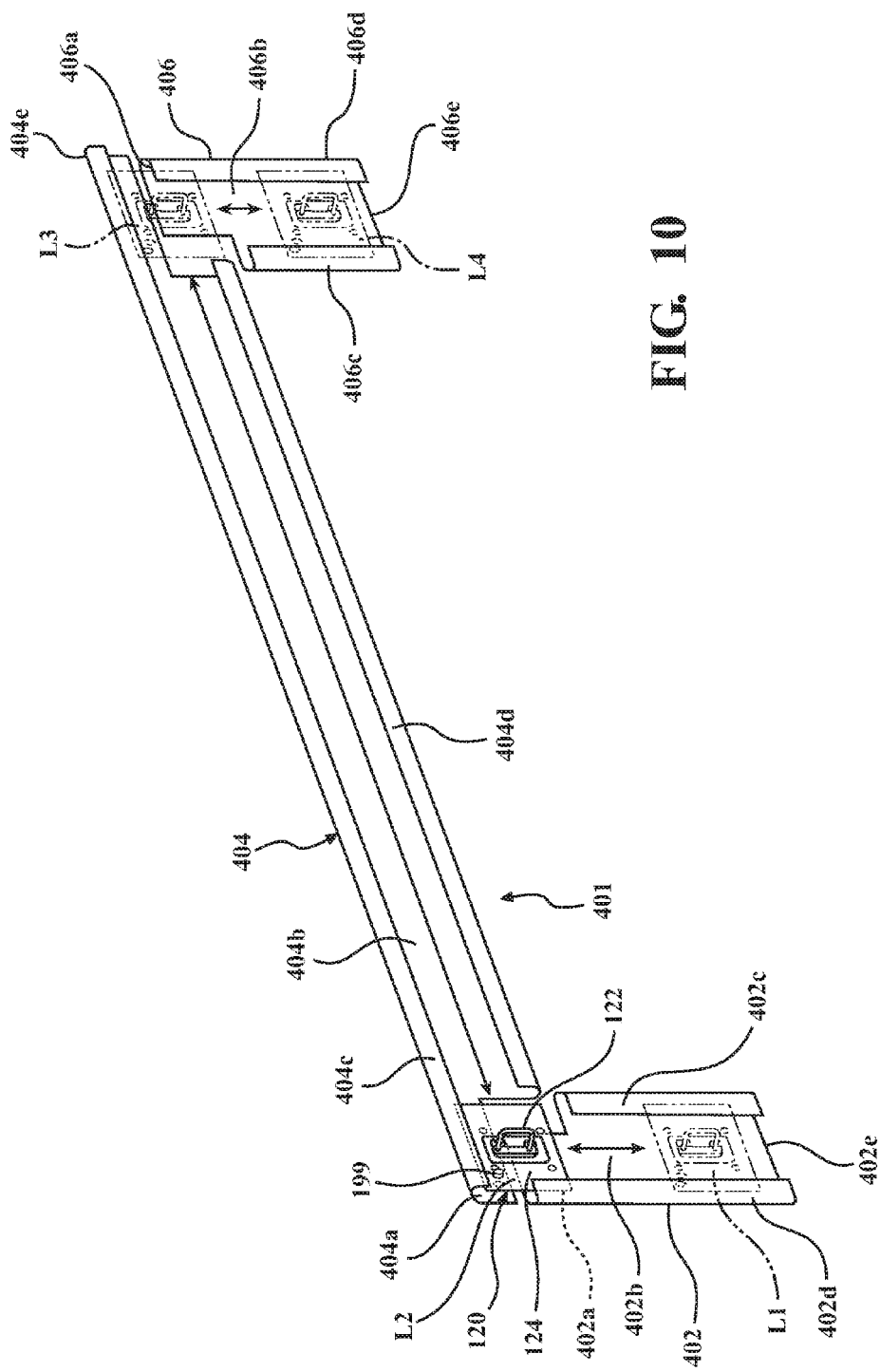
FIG. 10 is a schematic perspective view of an arrangement of tie down assembly guide members in accordance with an embodiment described herein.

Referring now to FIGS. 10-12, in one or more arrangements, one or more guide members are structured to be mountable along an associated cargo bed sidewall. The guide members may be attached to metal sidewalls forming a truck cargo bed, or the guide members may be attached to sidewalls of a polymeric bed liner which form sidewalls of the cargo bed when the bed liner is installed in the truck bed. The arrangement shown in FIG. 10 includes three guide members 402, 404, and 406 structured for attachment to a cargo bed sidewall adjacent each other. As described herein, the guide members may be attached to a sidewall so as to cooperate in providing passages along which one or more tie down assemblies may be movable. Alternatively, a single guide member may be attached to each sidewall of the cargo bed so that tie down members in tie down assemblies mounted in the guide members may be cooperatively aligned, as previously described. The guide members in conjunction with tie down assemblies mounted in the guide members may form a tie down system for a vehicle cargo bed.

In the embodiment shown, each guide member may have a first end, a second end opposite the first end, a base portion, and a pair of opposed flanges extending from the opposite sides of the base portion so as to be spaced apart from the base portion. For example, a first guide member 402 may have a first end 402a, a second end 402e, a base portion 402b and a pair of opposed flanges 402c, 402d extending from the base portion 402b so as to be spaced apart from the base portion 402b. As shown in FIG. 10, the base portions and the flanges of each guide member combine to define a respective channel structured for receiving and retaining therein a mounting bracket 124 of a tie down assembly 120 structured as previously described. This arrangement enables the tie down assembly 120 to slide along the lengths of the guide members. The guide members may be formed separately from the cargo bed sidewalls and may be structured to be attachable to a sidewall at any desired or suitable locations. The guide members may be formed from any suitable material, for example, a metallic or polymeric material.

At designated locations, one or more holes (not shown) may be formed in base portions of the guide members. The holes may be structured for receiving therein ends of spring pins mounted on the tie assembly mounting brackets 124 and used to secure the mounting brackets in desired locations along the guide members. For example, referring to FIG. 10, spring pin-receiving holes may be provided in guide member 402 for securing tie down assembly 120 in at least a location L1 along guide member 402; in guide member 404 for securing tie down assembly 120 in at least locations L2 and L3 along guide member 404; and in guide member 406 for securing tie down assembly 120 in at least a location L4 along guide member 406.

As shown in FIG. 10, guide members 402, 404, and 406 may be structured and positioned so as to provide a continuous passage for movement of one or more tie down assemblies along a length of the guide member. Thus, for example, adjacent ends 402a of guide member 402 and 404a of guide member 404 may be structured so that a tie down assembly 120 exiting a channel defined by guide member 402 may slide directly into a channel defined by guide member 404. This arrangement enables a tie down assembly to be rapidly and easily repositioned and secured in a desired location along the sidewall, without the need to permanently attach the tie down assembly to a sidewall. In one or more arrangements, multiple tie down assemblies may be positioned within an arrangement of guide members as shown in FIG. 10. These tie down assemblies may be secured along one of guide members 402, 404, 406 any of several locations, as described herein.

Guide members as shown in FIG. 10 may be secured to opposite sidewalls of the cargo bed so as to enable the movement of tie down assemblies along the guide members to positions where tie down members of the tie down assemblies may be rotated into alignment as shown in FIG. 9, and as previously described. Thus, as seen in FIG. 11 for example, a guide member 404-1 may be attached to a first sidewall 161 of the cargo bed and another, similarly configured guide member 404-2 may be attached to a second sidewall 163. The guide members 404-1 and 404-2 may be attached to the cargo bed walls so as to reside at the same height above a floor of the cargo bed, so that tie down assemblies movable along the guide members 404-1 and 404-2 may be aligned along a horizontal plane extending through both of guide members 404-1 and 404-2. Similarly, guide members 406-1 and 402-2 may be secured to the bed sidewalls directly opposite each other, and guide members 406-2 and 402-1 may be secured to the bed sidewalls directly opposite each other.

Each of tie down assemblies 120-1 and 120-2 may include an associated tie down member (122-1 and 122-2, respectively) which is securable in at least one angular orientation as previously described. Each of tie down assemblies 120-1 and 120-2 may be movable along the guide members and secured at one or more predetermined location(s) along a guide member. These predetermined location(s) may be arranged so as to enable alignment between tie down members of the tie down assemblies positioned on opposite sides of the cargo bed, as shown in FIG. 9. Examples of such an arrangement are shown in FIGS. 11 and 12.

The tie down assemblies 120-1 and 120-2 may be structured as previously described, except that a spring pin 199 may be mounted on the mounting bracket of each tie down assembly. An end of the spring pin 199 may be structured to slide into one of the guide member spring pin-receiving holes as previously described, to secure the tie down assembly in an associated position along the guide member. When it is desired to reposition the tie down assembly, the spring pin end may be extracted from a hole and the tie down assembly moved along the guide member. Securment means other than spring pins may also be used.

FIGS. 11 and 12 illustrate one possible arrangement of guide members on opposite sides of a cargo bed 152. FIGS. 11 and 12 show first guide members 402-1, 404-1, and 406-1 mounted to a first sidewall 161 of the cargo bed 152, and second guide members 402-2, 404-2, and 406-2 mounted to a second sidewall 163 of the cargo bed 152 opposite the first sidewall 161. In the embodiment shown, guide members 402-1 and 406-2 are positioned directly opposite each other, guide members 404-1 and 404-2 are positioned directly opposite each other, and guide members 406-1 and 402-2 are positioned directly opposite each other.

A first tie down assembly 120-1 is shown positioned within guide member 404-1 so as to be movable along the guide member. The tie down assembly 120-1 may be securable in one or more predetermined locations along the guide member 404-1, as previously described. Tie down assembly 120-1 includes a tie down member 122-1 securable in one or more angular orientations as previously described when the tie down assembly 120-1 is secured in a predetermined location along the guide member 404-1. In FIG. 11, the tie down assembly 120-1 is shown positioned in a location in the cargo bed similar to location P4 of FIG. 9. In addition, a second tie down assembly 120-2 is shown positioned within guide member 404-2 so as to be movable along the guide member. The tie down assembly 120-2 may be securable in one or more predetermined locations along the guide member 404-2, as previously described. Tie down assembly 120-2 includes a tie down member 122-2 securable in one or more angular orientations when the tie down assembly 120-2 is secured in a predetermined location along the guide member 404-2. In FIG. 11, the tie down assembly 120-2 is shown positioned in a location in the cargo bed similar to location P1 of FIG. 9.

As seen in FIG. 11, the tie-down members of tie down assemblies 120-1 and 120-2 may be aligned with each other and secured so as to lie along a plane 200 as shown in FIG. 9 and as previously described. For example, in the embodiment shown in FIG. 11, each of the tie down members 122-1 and 122-2 shown may be secured at a 45° with respect to a vertical plane passing through a fore-aft axis if the vehicle as shown in FIG. 9. In addition, the angular orientations of tie down members 122-1 and 122-2 are in alignment (i.e., a plane 200 passing through the rotational axes of the base portions of the tie down members 122-1 and 122-2 also passes through the associated tie down attachment portions of the tie down members as previously described) so that the forces exerted on a tie down strap, etc. connecting the tie down attachment portions tend to act along the plane P1.

Referring now to FIG. 12, first tie down assembly 120-1 remains secured in the location shown in FIG. 11. The angular orientation of tie down member 122-1 has been changed so that the tie down member extends toward location P3 of FIG. 9. In addition, second tie down assembly 120-2 has been moved along the length of guide member 404-2 so that the tie down assembly is positioned and secured in location P3 of FIG. 9. In this arrangement, the tie-down members of tie down assemblies 120-1 and 120-2 are aligned with each other and secured so as to lie along a plane 205 as shown in FIG. 9 and as previously described. The tie down assembly arrangement of FIG. 12 may be used to meet a tie down requirement different from the requirement met by the configuration in FIG. 11.

The use of the guide members as described above enables individual tie down assemblies to be positioned as desired by a user, without the need of permanent attachment to the cargo bed sidewalls. Holes for the spring pins may be formed at any desired locations along the guide members, permitting the tie down assembly positions to be adjusted as desired. Also, indexing cavities may be positioned in the mounting brackets so that the mounting members may be oriented and secured at any of a variety of angles with respect to a vertical plane V2 extending through the fore-aft axis of the vehicle.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The phrase "at least one of . . . and . . . " as used herein refers to and encompasses any and all possible combinations of one or more of the associated listed items. As an example, the phrase "at least one of A, B and C" includes A only, B only, C only, or any combination thereof (e.g. AB, AC, BC or ABC).

Aspects herein can be embodied in other forms without departing from the spirit or essential attributes thereof. Accordingly, reference should be made to the following claims, rather than to the foregoing specification, as indicating the scope of the invention.

What is claimed is:

1. A tie down assembly structured to be coupled to a sidewall of a vehicle cargo bed, the assembly comprising:
   a mounting bracket structured to be positionable and securable along the sidewall; and
   a tie down member rotatably coupled to the mounting bracket and including a base portion rotatably coupled to the mounting bracket, a tie down attachment portion attached to the base portion, and an indexing member,
   the mounting bracket including a first indexing cavity structured for receiving the indexing member therein, and a second indexing cavity angularly spaced apart from the first indexing cavity and structured for receiving the indexing member therein,
   wherein the tie down assembly is structured such that, when the tie down assembly is positioned along a sidewall of the vehicle cargo bed, a vertical plane passing through the tie down attachment portion and a rotational axis of the base portion extends at a first predetermined angle with respect to a vertical plane extending through a fore-aft axis of the vehicle when the indexing member resides within the first indexing cavity,
   and the vertical plane passing through the tie down attachment portion and the rotational axis of the base portion extends at a second predetermined angle with respect to the vertical plane extending through the fore-aft axis of the vehicle when the indexing member resides within the second indexing cavity,
   and such that, when the indexing member resides within at least one of the first indexing cavity and the second indexing cavity, the vertical plane passing through the tie down attachment portion and the rotational axis of the base portion does not extend parallel to the vertical plane extending through the fore-aft axis of the vehicle.

2. The tie down assembly of claim 1 wherein the second predetermined angle is different from the first predetermined angle.

3. The tie down assembly of claim 1 wherein one of the first predetermined angle and the second predetermined angle is 90 degrees.

4. The tie down assembly of claim 1 wherein one of the first predetermined angle and the second predetermined angle is 45 degrees.

5. A tie down assembly structured to be coupled to a sidewall of a vehicle cargo bed, the assembly comprising:
   a mounting bracket structured to be positionable and securable along the sidewall; and
   a tie down member rotatably coupled to the mounting bracket and including an indexing member,
   the mounting bracket including a first indexing cavity structured for receiving the indexing member therein, and a second indexing cavity angularly spaced apart from the first indexing cavity and structured for receiving the indexing member therein,
   wherein the tie down assembly is structured such that the tie down member is secured in a first angular orientation when the indexing member resides within the first indexing cavity, and in a second angular orientation different from the first angular orientation when the indexing member resides within the second indexing cavity, the tie down assembly further comprising a spring member structured to bias the tie down member so as to maintain the indexing member in a selected one of the first indexing cavity and the second indexing cavity, and wherein the tie down member comprises a base portion rotatably coupled to the mounting bracket, the base portion having a first end and a second end, and wherein the mounting bracket includes a first receptacle structured for receiving the spring member therein, the first receptacle also being structured for receiving the base portion first end therein so as to engage the spring member.

6. The tie down assembly of claim 5 wherein the mounting bracket further comprises a second receptacle structured for receiving the base portion second end therein, wherein the second receptacle includes the first indexing cavity and the second indexing cavity, and wherein the indexing member extends from the base portion proximate the base portion second end.

7. The tie down assembly of claim 6 wherein the base portion first and second ends are movable within respective ones of the first and second receptacles so as to enable movement of the indexing member in and out of the first indexing cavity and the second indexing cavity.

8. The tie down assembly of claim 7 wherein the base portion second end is movable within the second receptacle to compress the spring member when the indexing member moves out of the first indexing cavity and out of the second indexing cavity.

9. The tie down assembly of claim 7 wherein the tie down assembly is structured such that movement of the indexing member out of either of the first indexing cavity and the second indexing cavity compresses the spring member and enables rotation of the base portion.

10. The tie down assembly of claim 1 wherein at least one of the first indexing cavity and the second indexing cavity has a first sloping wall and a second sloping wall extending opposite the first sloping wall.

11. The tie down assembly of claim 10 wherein the mounting bracket is structured such that rotation of the tie down member causes the indexing member to slide along one of the first sloping wall and the second sloping wall.

12. The tie down assembly of claim 11 further comprising a spring member structured to bias the tie down member so as to maintain the indexing member in a selected one of the first indexing cavity and the second indexing cavity, and wherein the mounting bracket is structured such that sliding of the indexing member along one of the first sloping wall and the second sloping wall causes the spring member to be compressed.

13. A tie down assembly structured to be coupled to a sidewall of a vehicle cargo bed, the assembly comprising:
  a mounting bracket structured to be positionable and securable along the sidewall; and
  a tie down member rotatably coupled to the mounting bracket and including an indexing member,
  the mounting bracket including a first indexing cavity structured for receiving the indexing member therein, and a second indexing cavity angularly spaced apart from the first indexing cavity and structured for receiving the indexing member therein,
  wherein the tie down assembly is structured such that the tie down member is secured in a first angular orientation when the indexing member resides within the first indexing cavity, and in a second angular orientation different from the first angular orientation when the indexing member resides within the second indexing cavity, wherein the tie down member comprises a base portion rotatably coupled to the mounting bracket, and a tie down attachment portion connected to the base portion and structured for attachment of a tie-down strap thereto, and wherein the tie-down attachment portion is structured to extend through an opening formed in the sidewall of the vehicle cargo bed when the mounting bracket is mounted to the sidewall of the vehicle cargo bed.

14. A tie down assembly structured to be coupled to a sidewall of a vehicle cargo bed, the assembly comprising:
  a mounting bracket structured to be positionable and securable along the sidewall; and
  a tie down member rotatably coupled to the mounting bracket and including an indexing member,
  the mounting bracket including a first indexing cavity structured for receiving the indexing member therein, and a second indexing cavity angularly spaced apart from the first indexing cavity and structured for receiving the indexing member therein,
  wherein the tie down assembly is structured such that the tie down member is secured in a first angular orientation when the indexing member resides within the first indexing cavity, and in a second angular orientation different from the first angular orientation when the indexing member resides within the second indexing cavity, wherein the mounting bracket has an opening formed therein, and wherein the tie down member includes a base portion positioned on a first side of the mounting bracket, the base portion being structured to be secured to a side of the sidewall facing opposite an interior of the vehicle cargo bed, and a tie down attachment portion connected to the base portion so as to extend through the opening to a second side of the mounting bracket opposite the first side.

* * * * *